INVENTORS.
Evelyn C. Marboe & Woldemar A. Weyl
BY
Christel & Bean
ATTORNEYS.

INVENTORS.
Evelyn C. Marboe & Woldemar A. Weyl
BY
Christel & Bean
ATTORNEYS.

United States Patent Office 3,642,651
Patented Feb. 15, 1972

3,642,651
PHOTOLUMINESCENT GLASS AND METHOD OF MAKING THE SAME
Evelyn C. Marboe and Woldemar A. Weyl, State College, Pa., assignors to Brockway Glass Company, Inc., Brockway, Pa.
Filed Apr. 7, 1969, Ser. No. 813,986
Int. Cl. C09k 1/54; C03c 3/28
U.S. Cl. 252—301.4 R                             5 Claims

ABSTRACT OF THE DISCLOSURE

Borate, phosphate or silicate glasses, or combinations thereof, are melted with a germanium compound, such as germanium dioxide, under suitable reducing conditions. The amount of germanium dioxide is in the range of 1% to 20% by weight of the mixture, and suitable reducing agents are azides, nitrides, aluminum powder or some form of carbonaceous material. The reaction is sensitive to the time and temperature of melting which, in turn, is dependent on the type of glass and reducing agent employed. The glass composition formed upon cooling exhibits fluorescence when irradiated by ultraviolet light having a wavelength approximately in the range of 2500–3700 A.

BACKGROUND OF THE INVENTION

This invention relates to glass compositions which exhibit fluorescence in response to ultraviolet light and, more particularly, to a method of making such glasses.

Materials which exhibit fluorescence in response to ultraviolet light are becoming increasingly significant in many practical applications, one being as laser materials. As the demand for such materials is increasing, so is the need for relative ease and economy in the manufacturing of them.

SUMMARY OF THE INVENTION

The present invention provides a new and useful photoluminescent glass composition and method of making the same which composition emits light when excited by ultraviolet radiation. A suitable amount of germanium dioxide is added to a relatively larger amount of a desirable oxide base glass composition, such as silicates, borates, or phosphates and combinations thereof. A reducing agent is added to the mixture, the kind and amount being dependent to some extent upon the particular glass used and the melting conditions: time, temperature and atmosphere. The mixture is then melted under suitable conditions and upon cooling a glass is obtained which fluoresces in response to ultraviolet light of a given wavelength.

One desirable feature of the photoluminescent material provided by this invention is the relative ease by which it can be manufactured. While one suggested use of the germanium-containing glass is as a laser material, it should be understood that this is merely illustrative of the many possible uses of such a photoluminescent glass.

The energy indicated on the ordinates in FIGS. 1 through 4 is in arbitrary units.

DESCRIPTION OF THE PREFERRED EMBODIMENTS

We have found that under reducing conditions, germanium in glass produces a visible fluorescence when excited by ultraviolet light. This fluorescence is probably due to divalent germanium.

Tests were conducted with borate, phosphate and silicate glasses. The fluorescence of the photoluminescent borate and silicate glasses is seen when excited by ultraviolet light having a relatively long wavelength (3650 A.). The fluorecence of corresponding phosphate glasses, on the other hand, is seen upon excitation by ultraviolet light having a relatively short wavelength (2537 A.). The phosphate as a base glass shifts the absorption band to the shorter wavelength.

The method of the present invention will now be described in detail in conjunction with the various tests which were conducted. As previously noted, silicate glass is one of the three varieties which was employed in the tests.

One particular silicate glass used has the following composition in percent by weight: 66.9% $SiO_2$, 25% $Na_2O$, 8% CaO, approximately 0.05% $Al_2O_3$, and approximately 0.01% $Fe_2O_3$ and $TiO_2$. To this base glass composition germanium dioxide was added in an amount constituting 5.0% by weight of the resulting mixture. A reducing agent, for example, boron nitride, was added in an amount constituting 2.5% by weight of the resulting mixture. A 20 gram sample of the mixture was melted in a porcelain crucible in an electric furnace under an ordinary atmosphere at 1250–1300° C. for 30 minutes. The molten glass was then poured into a graphite mold and allowed to cool in the air.

Figure 1:
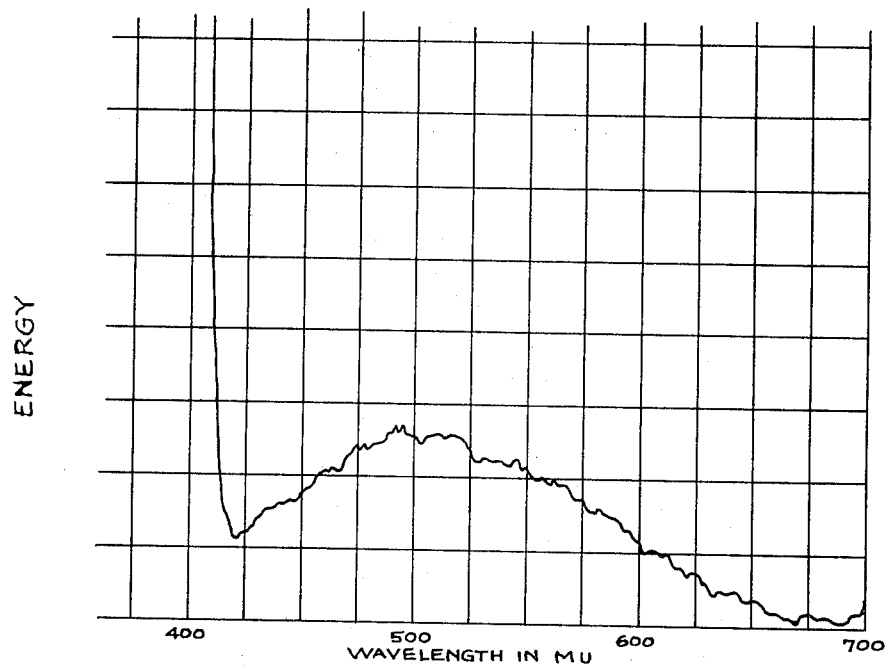
FIGS. 1–4 are spectrographs showing the energy distribution of the emitted light as a function of wavelength when various photoluminescent glasses provided by this invention are irradiated by ultraviolet light having a given wavelength.

The resulting glass is colorless, and when irradiated by ultraviolet light having a wavelength of 3650 A., the glass exhibited a bright red-orange fluorescence. A fluorescent spectral analysis was made on this particular sample and is shown in FIG. 1. The analysis of this sample and those to be described herein were made on a Beckman DK–2A Ratio Recording Spectrophotometer having a UG–11 filter and transmitting in the range of 2500–3800 angstroms. Similar fluorescences of slightly different colors were exhibited in response to the same irradiation when germanium-containing silicate glass was melted with different reducing agents, for example, anthracite coal or nitrides of magnesium, zirconium, calcium, aluminum or silicon. The results of these tests are summarized in Table 1.

TABLE 1

| Base glass composition, percent by weight | Percent by weight of $GeO_2$ | Reducing agent, percent by weight | Fluorescent color when irradiated |
|---|---|---|---|
| 66.9% $SiO_2$, 25% $Na_2O$, 8% CaO, ~0.05% $Al_2P_3$, ~0.01% ($Fe_2O_3$ plus $TiO_2$). | 5.0 | 2.5% BN | Bright red-orange. |
| | 5.0 | 2.5% anthracite coal | Do. |
| | 5.0 | 5.0% carbon black | Yellow-orange. |
| | 5.0 | 5.0% sucrose | Do. |
| | 5.0 | 2.5% ZrN | Bright red-orange. |
| | 5.0 | 1% $Mg_3N_2$ | Pink-orange. |
| | 5.0 | 0.25% $Mg_3N_2$ | Do. |
| | 5.0 | 1% $Si_3N_4$ | Do. |
| 50% $SiO_2$, 22% $Na_2O$, 8% CaO, 20% $x$ | $x$=20.0 | None | None. |
| | 20.0 | 2.5% BN | Brilliant pink-orange. |
| | 20.0 | $(NH_4)_2 CO_3$ | Brilliant red-orange. |
| | 20.0 | Al powder | Brilliant pink-orange. |
| | 20.0 | Carbon black | Pink-orange. |

A second type of silicate glass examined has the following composition in percent by weight: 50% $SiO_2$, 22% $Na_2O$, 8% CaO, and 29% $GeO_2$. To the glass batch a reducing agent, such as boron nitride, was added in the amount of 2.5% by weight. A 20 gram sample was melted in a porcelain crucible in an electric furnace under an ordinary atmosphere at 1250–1300° C. for 30 minutes. The molten glass was then poured into a graphite mold and allowed to cool in the air.

Figure 2:
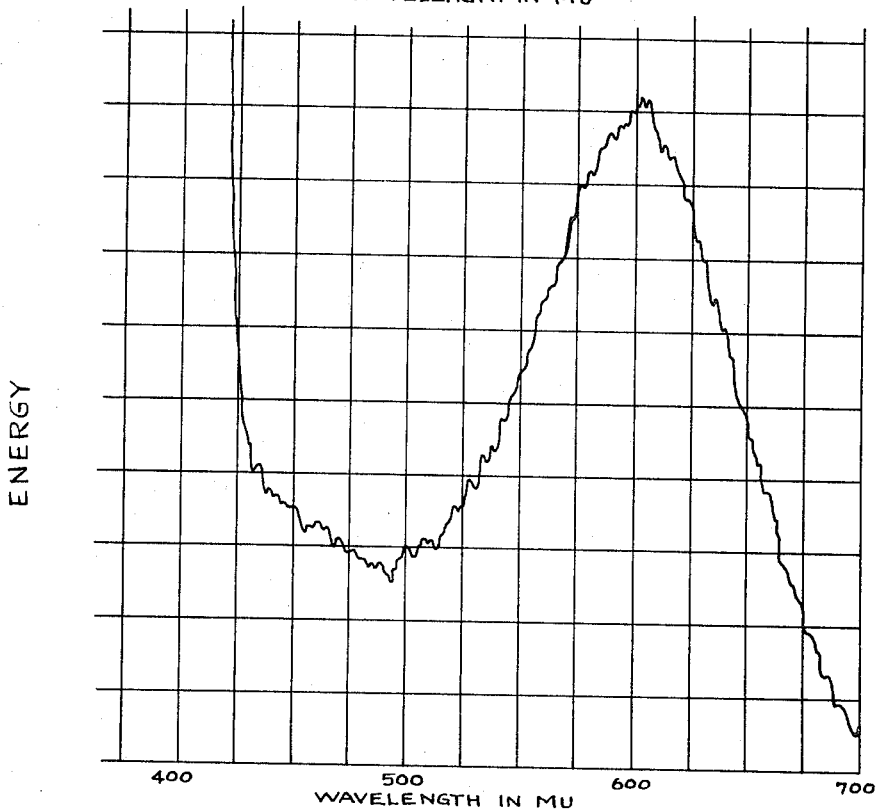

The resulting colorless glass, when irradiated by ultraviolet light having a relatively long wavelength of 3650 A., exhibits a brilliant pink-orange fluorescence. The emission spectrum is shown in FIG. 2. The same pink-orange fluorescence was exhibited under identical irradiation when other reducing agents were used, for example, ammonium carbonate, aluminum powder, sodium azide, carbon black, magnesium nitride or silicon nitride. The results of these tests are also summarized in Table 1.

It was also noted that a germanium-containing silicate glass, specifically glass having a composition of 50% $SiO_2$, 22% $Na_2O$, 8% CaO, and 20% $GeO_2$ by weight when remelted with a reducing agent such as carbon black, results in a glass which fluoresces under similar conditions. In addition, if a silicate glass containing a reducing agent such as $Mg_3N_2$ or $Si_3N_4$ is remelted with the addition of $GeO_2$, fluorescing glasses are produced. The results of these additional tests are also summarized in Table 1.

Borate glass is a second variety which was employed in the tests. The effectiveness of carbon as a reducing agent to produce fluorescence in a germanium-containing borate glass was found to vary with the compound form in which the carbon is introduced. One base glass composition usable is sodium borate glass powder, having the chemical formula $Na_2B_4O_7$. To the glass powder is added 5% by weight of germanium dioxide. Then to this mixture a suitable reducing agent in a particular amount is added, for example 5% by weight of carbon black.

A 20-gram sample was melted in a porcelain crucible in an electric globar furnace under an ordinary atmosphere at 1000° C. for 30 minutes. The molten glass was then poured into a graphite mold and allowed to cool to the air. A colorless glass results.

Figure 3:
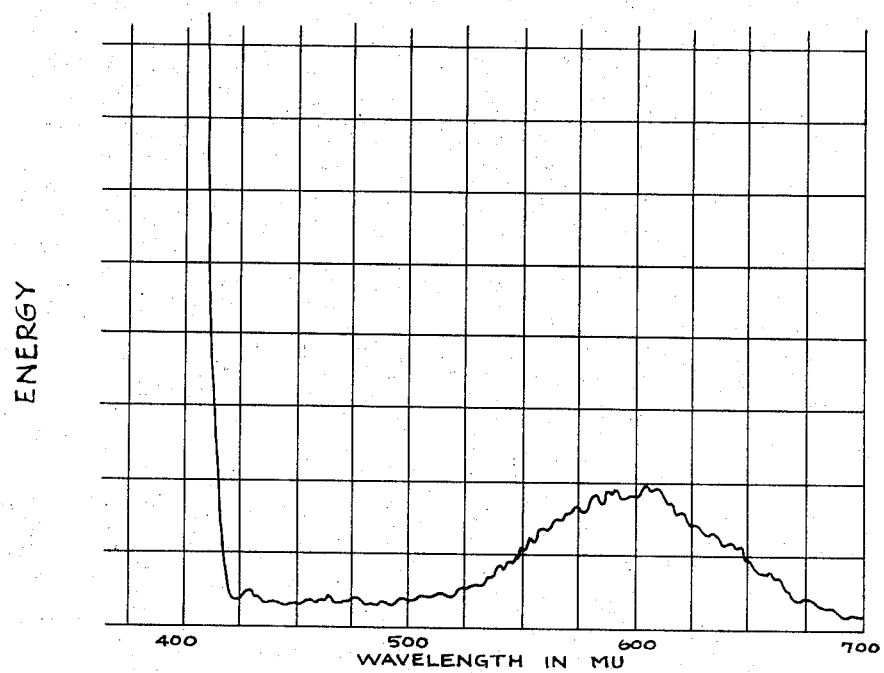

The glass thus produced exhibited a brilliant pink-orange fluorescence when irradiated by ultraviolet light having a relatively long wavelength of 3650 A. The emission spectrum is shown in FIG. 3. Other alkali diborates, such as lithium diborate and potassium diborate, give similar results. Other effective reducing agents used were cellulose, sucrose, carbon black, anthracite coal, boron nitride, sodium azide, ammonium carbonate and aluminum powder. The resulting glasses showed a brilliant pink-orange fluorescence in response to ultraviolet light at 3650 A. The results are summarized in Table 2.

TABLE 2

| Base glass composition | Percent by wt. of $GeO_2$ | Reducing agent percent by wt. | Fluorescent color when irradiated |
| --- | --- | --- | --- |
| $Na_2B_4O_7$ | 5.0 | 10% cellulose powder | Brilliant pink-orange. |
| $Na_2B_4O_7$ | 5.0 | 5% sucrose | Do. |
| $Na_2B_4O_7$ | 5.0 | 5% carbon black | Do. |
| $Na_2B_4O_7$ | 5.0 | 0.5% anthracite coal | Do. |
| $Li_2B_4O_7$ | 5.0 | 2.5% BN | Do. |
| $Na_2B_4O_7$ | 5.0 | 2.5% BN | Do. |
| $NaLiB_4O_7$ | 5.0 | 2.5% BN | Do. |
| $K_2B_4O_7$ | 5.0 | 2.5% BN | Do. |

Figure 4:
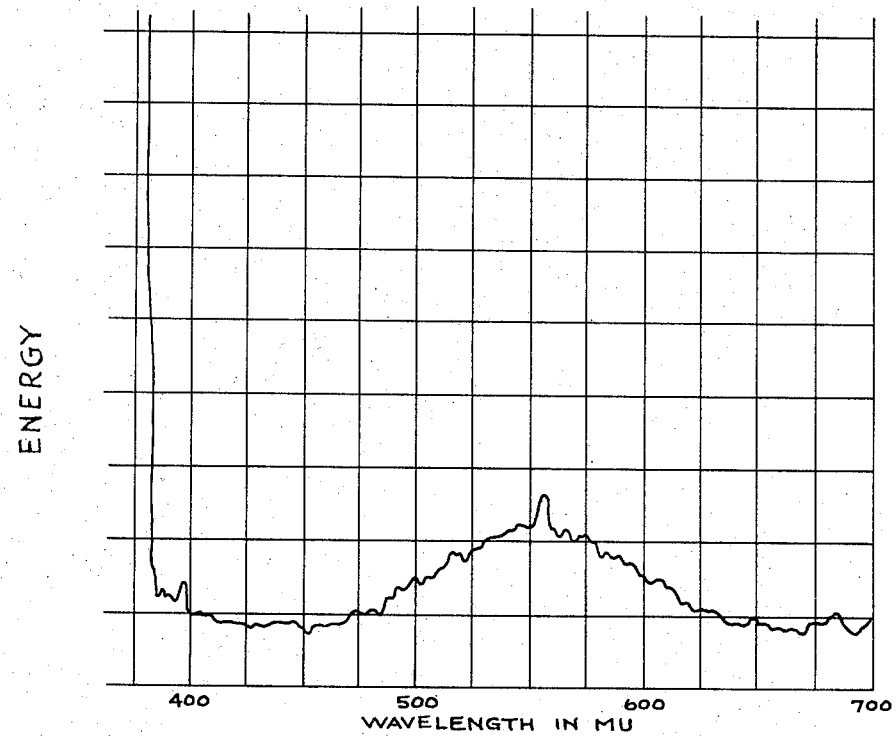

Phosphate glass was the third variety investigated. In a phosphate glass, under reducing conditions, germanium was found to produce a visible fluorescence when irradiated by ultraviolet light having a relatively short wavelength of 2537 A. A base glass composition usable is sodium metaphosphate, $NaPO_3$. To the base glass is added 5% by weight of germanium dioxide. In one test, carbon black in an amount of 2% by weight was added as a reducing. A 20-gram sample of this mixture was melted in a porcelain crucible in an electric furnace at 900° C. for 30 minutes whereupon it was poured into a graphite mold and allowed to cool in the air. The resulting colorless glass exhibited a brilliant pink-orange fluorescence when irradiated with ultraviolet light having a wavelength of 2537 A. The emission spectrum is shown in FIG. 4. The phosphate as a base glass shifts the absorption band to a shorter wavelength.

It was found that cellulose, sucrose and anthracite coal, for example, could be substituted as reducing agents for the carbon black and in varying amounts by weight.

The conclusions derived from these tests may be summarized briefly as follows. The glass of the present invention may be a silicate, borate, or phosphate, or combination thereof. The amount of germanium dioxide which was introduced in our glass melts varied between 1% and 20% by weight. Reducing agents used were azides, nitrides, aluminum powder, or some form of carbonaceous material. Under the proper time and temperature of melting, a glass is produced which exhibits an orange to red fluorescence when irradiated by ultraviolet light.

We claim:

1. A method of making a photoluminescent glass capable of exhibiting fluoresence when irradiated by ultraviolet light comprising the steps of:
   (a) adding germanium dioxide in an amount constituting about 1–20% by weight to a soda-lime-silica glass batch;
   (b) melting the mixture at approximately 1250–1300° C. for about thirty minutes under atmospheric pressure with a reducing agent present in the melt, the reducing agent constituting about 2.5–5.0% by weight of the mixture and selected from the group consisting of carbon, ammonium carbonate, aluminum, sodium azide and the nitrides of boron, magnesium, zirconium, calcium, aluminum and silicon; and
   (c) cooling the melted composition.

2. A method of making a photoluminescent glass capable of exhibiting fluorescence when irradiated by ultraviolet light comprising the steps of:
   (a) adding germanium dioxide in an amount constituting about 1–20% by weight to an oxide glass batch wherein the oxide base is $Na_2B_4O_7$;
   (b) melting the mixture about at 1000 degrees C. for about thirty minutes under atmospheric pressure with a reducing agent present in the melt, the reducing agent consisting essentially of anthracite coal and constituting about at least 0.5 percent by weight of the mixture; and
   (c) cooling the melted composition.

3. A method of making a photoluminescent glass capable of exhibiting fluorescence when irradiated by ultraviolet light comprising the steps of:
   (a) adding germanium dioxide in an amount constituting about 1–20% by weight to an oxide glass batch wherein the oxide base is $Na_2B_4O_7$;
   (b) melting the mixture about at 1000 degrees C. for about thirty minutes under atmospheric pressure with a reducing agent present in the melt, the reducing agent consisting essentially of cellulose, sucrose or carbon black and constituting about 5–10% of the mixture; and
   (c) cooling the melted composition.

4. A method of making a photoluminescent glass capable of exhibiting fluorescence when irradiated by ultraviolet light comprising the steps of:
   (a) adding germanium dioxide in an amount constituting about 1–20% by weight to an oxide glass batch wherein the oxide base is $NaPO_3$;
   (b) melting the mixture with a reducing agent present in the melt, the reducing agent consisting essentially of carbon black, cellulose powder, sucrose or anthracite coal and constituting about two percent by weight of the mixture; and
   (c) cooling the melted composition.

5. The method of claim 4 wherein said step of melting is about at 900° C. for 20–30 minutes.

References Cited

UNITED STATES PATENTS

| | | | |
|---|---|---|---|
| 2,270,124 | 1/1942 | Huniger et al. | 252—301.4 R |
| 2,440,048 | 4/1948 | Hood | 252—301.4 |
| 2,824,072 | 2/1958 | Butler | 252—301.4 P |
| 3,255,120 | 6/1966 | Cohen | 252—301.4 |

FOREIGN PATENTS 666,852   7/1963   Canada _____ 252—301.4

ROBERT D. EDMONDS, Primary Examiner

U.S. Cl. X.R.

106—47, 52; 252—301.4 F, 301.4 P